United States Patent

[11] 3,567,881

[72] Inventors Fred A. Duimstra;
Douglas O. Schuler, Albuquerque, N. Mex.
[21] Appl. No. 883,736
[22] Filed Dec. 10, 1969
[45] Patented Mar. 2, 1971
[73] Assignee the United States of America as represented by the United States Atomic Energy Commission

[54] ROLLER-BAND INERTIAL SWITCH
10 Claims, 4 Drawing Figs.
[52] U.S. Cl. ................................................. 200/61.53, 200/153
[51] Int. Cl. ................................................. H01h 35/14
[50] Field of Search ........................................ 200/61.53, 153, 152 (Ball)

[56] References Cited
UNITED STATES PATENTS
3,452,175  6/1969  Wilkes ........................ 200/153
3,452,309  6/1969  Wilkes ........................ 335/209
3,471,668  10/1969  Wilkes ........................ 200/153

Primary Examiner—Robert K. Schaefer
Assistant Examiner—M. Ginsburg
Attorney—Roland A. Anderson ABSTRACT: A roller-band inertial switch operable over a predetermined temperature range including a housing; a roller-band cluster disposed within the housing and having a first roller, a second spool-shaped roller and a tension band supporting the rollers within the housing, said band including an oblong orifice adjacent the spool-shape roller and a force-biasing opening adjacent the other roller to bias the cluster adjacent an end wall of the housing; electrical sensing means disposed at the other end wall of the housing to sense movement of the cluster to the other end wall; and a damping fluid in the housing filling the housing at a temperature above the predetermined temperature range and a method for forming the housing.

PATENTED MAR 2 1971        3,567,881
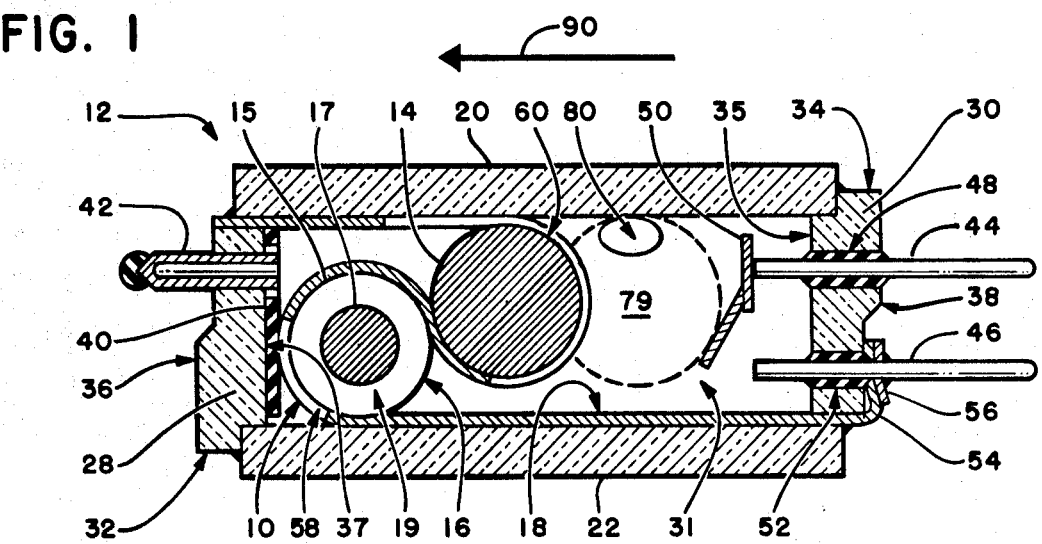
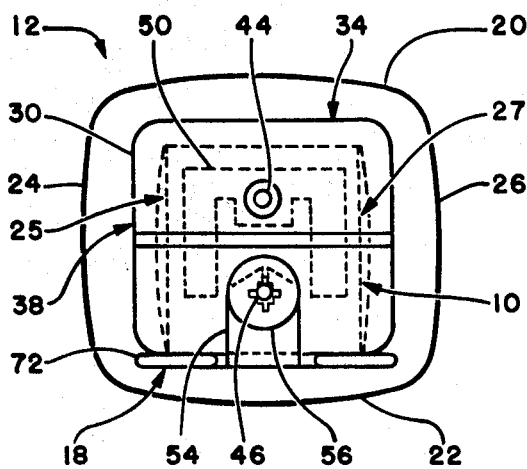
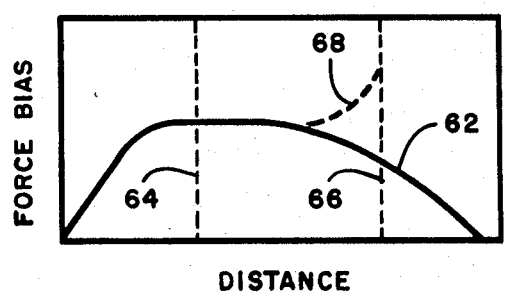
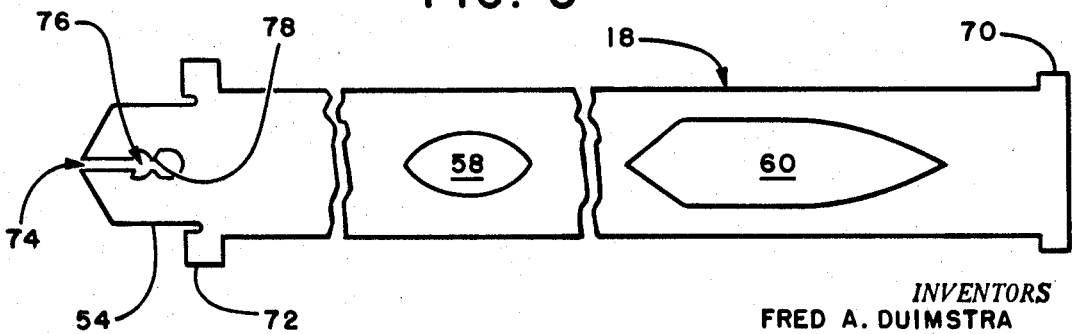
INVENTORS
FRED A. DUIMSTRA
DOUGLAS O. SCHULER
BY

3,567,881

ROLLER-BAND INERTIAL SWITCH

BACKGROUND OF INVENTION

Accelerometers and inertial sensing devices are widely used to measure accelerations or other forces resulting from vibrations, changes in speed, or the like. Such accelerometers or inertial sensing devices may include some form of sensing mass suspended with the system or device so as to be affected by the acceleration or other force and moved against some sort of sensing mechanism, such as the closure of an electrical switch or contacts. Roller-band devices, such as those described in U.S. Pat. Nos. 3,452,175, 3,452,309 and 3,471,668, are particularly adaptable to such applications. In these roller-band devices, the rollers in the roller-band cluster form the desired sensing mass. The tension-band of the roller-band cluster suspends and constrains the rollers within an appropriate guideway so as to provide virtually frictionless movement of the roller-band cluster along the guideway. These roller-band devices thus are capable of sensing accelerations or other forces with a high degree of accuracy due to the low and predictable inherent friction losses.

In many of these accelerations or other force sensing applications, it is desirable that the sensing mass be restrained by some type of damping means, such as a damping fluid, to provide a measurement of force per unit time, e.g., g-seconds. Since the viscosity of damping fluids may vary with changing temperature, such devices are inherently limited as to accuracy over any significant temperature range. For example, the viscosity of a typical damping fluid such as silicon oil, may vary as much as 500 percent over the temperature range of from about −65 to +160° F. A g-second product for a conventional device to operate over this range with such a silicon oil damping fluid may vary by ±30 percent or more.

SUMMARY OF INVENTION

In view of the limitations of the prior art as noted above, it is an object of this invention to provide a roller-band inertial switch which is operable accurately over a predetermined temperature range.

It is a further object of this invention to provide an inertial switch of simple construction and design.

Various other objects and advantages will appear from the following description of an embodiment of the invention, and the most novel features will be particularly pointed out hereinafter in connection with the appended claims. It will be understood that various changes in the details, materials and arrangements of the parts, which have been herein described and illustrated in order to explain the nature of the invention, may be made by those skilled in the art.

The invention comprises a roller-band device including a housing having guideway walls, sidewalls and end walls; a roller-band cluster disposed within said housing, said roller-band cluster having a first roller, a second spool-shaped roller and a tension-band supporting and restraining the rollers within said housing, said band including an oblong orifice adjacent the spool-shaped roller and a force biasing opening adjacent the first roller to bias the roller-band cluster adjacent one of the end walls; electrical sensing means disposed at the other end wall for sensing movement of the roller-band cluster to the other end wall; and a damping fluid in the housing filling the housing at a temperature above a desired operating temperature range.

DESCRIPTION OF DRAWING

The invention as illustrated in the drawing wherein:

FIG. 1 is a cross-sectional, side view of a roller-band device incorporating features of this invention;

FIG. 2 is an end view of the device of FIG. 1;

FIG. 3 is an elevation view of a tension-band design which may be utilized in the device of FIG. 1; and FIG. 4 is a force function diagram for the tension-band of FIG. 3.

DETAILED DESCRIPTION

The roller-band inertial switch or accelerometer of this invention, as illustrated in FIGS. 1 and 2, includes a roller-band cluster 10 disposed within a suitable casing or housing 12. Roller-band cluster 10 includes a first roller or rotatable member 14 a second rotatable member 16 and a tension band 18. Tension-band 18 may include certain cutouts or openings and be attached to housing 12 as described in detail below.

The dimensions and density of rotatable member 14 may be selected to provide the desired coaction between tension-band 18 and roller-band cluster 10. Rotatable member 16, however, is formed in a spoollike shape as illustrated having outer rim or ridge supporting portions 15 interconnected by a pin or spindle 17. Spindle 17 preferably is sufficiently smaller in dimension compared to rim portion 15 to provide a passageway 19 of sufficient size to minimize impediment of flow of fluid between spindle 17 and tension-band 18.

Housing 12 may include generally parallel oppositely disposed guideway walls 20 and 22, sidewalls 24 and 26, and end walls or end caps 28 and 30 forming an enclosed, sealed cavity 31. Guideway walls 20 and 22 and sidewalls 24 and 26 may be made as a unitary structure and formed from a tubular or the like stock as described below. Sidewalls 24 and 26 may be formed with suitable beveled corners, as shown in FIG. 2, to provide narrow side gaps or passageways 25 and 27 along the sides of roller-band cluster 10 for passage of fluid thereabout. Side gaps 25 and 27 may be maintained as small as possible relative to dimensions of a damping fluid orifice in tension-band 18 (e.g., orifice 58). End walls 28 and 30 may include flange or shoulder portions 32 and 34 about three sides thereof to overlappingly and sealingly engage and abut against the guideway and sidewalls of housing 12. As shown, tension-band 18 may be passed between the remaining fourth side of end walls 28 and 30 and the adjacent guideway wall 20 or 22 and fastened by suitable tabs or extensions on the band. It should be noted, that the ends of tension-band 18 are clamped or fastened to diagonally opposite ends of the guideway wall and are threaded in a generally S-shaped fashion about the rollers 14 and 16 so as to constrain and support the rollers in a stable roller-band cluster. End walls 28 and 30 each include a boss 35 and 37 fitting into the casing and may also be provided with a suitable raised or thickened portion 36 and 38 respectively to provide clearance for electrical connections. End walls 28 and 30 may be attached to guideway walls 20 and 22 and sidewalls 24 and 26 by any appropriate nonconductive adhesive such as certain epoxies which include thickening agents to minimize wicking and which is compatible with the environment which the device is to be subjected and with the damping fluid.

End wall 28, which is located at the "reset" end of housing 12 may be provided with a resilient shock-absorbing pad 40 to prevent any damage to end wall 28 from reset of the roller-band cluster 10. Pad 40 may be made of any suitable materials such as nitrile rubber epoxy or certain synthetic resilient materials. End wall 38 may also be provided with an initially open fill tube 42 which may be used to fill the cavity of housing 12 with the desired damping fluid. Tubing 42 may be made of any appropriate material which will seal to the material of end wall 28, such as certain alloys of iron, nickel and cobalt.

End wall 30, which may be designated as at the "actuate" end of the roller-band device, may be provided with a pair of electrical pins or contacts 44 and 46. Pin 44 may be passed through an opening 48 into the cavity of housing 12 and terminate with an appropriately shaped contact member 50. Contact member 50 may include any suitable bifurcated contacting surfaces or the like which will make positive electrical contact with tension-band 18 when the roller-band cluster reaches the actuate end of the device. Pin 46 may be suitably supported by end wall 30 such as by opening 52. Pin 46 may make contact with an appropriately shaped portion of tension-band 18 such as to tab 54. Tab 54 may be maintained in electrical contact with pin 46 by an appropriate conductive washer 56 and any conductive cement or adhesive, as deemed necessary. Pins 44 and 46 may be made of any appropriate material which will seal to openings 48 and 52 or they may be sealed therewith by suitable adhesives or sealants.

As shown in FIG. 3, tension-band 18 may include an orifice 58 for metering damping fluid and a suitably shaped force biasing opening 60 for biasing the roller-band cluster 10 to the reset end of housing 12. Orifice 58 may be of any suitable shape or of suitable size, depending on the desired rate of damping fluid metering. It has been found, that it is preferable that orifice 58 be generally oval, elliptic or oblong in shape, with generally V-shape ends and the narrow dimension transverse to the direction of tension-band flecture, to minimize any deformation of the tension-band as it bends around the curvature of the rollers and prevent generation of undesirable force functions. Likewise, it has been found that force biasing opening 60 should not include any abrupt or sudden changes in size to prevent the same distortion of the tension-band. Opening 60 may be located along tension-band 18 so as to be adjacent the contact zone or line of roller 14 with guideway wall 20 without the movement of roller-band cluster 10. The length and dimensions of opening 60 may be chosen to provide a force function as shown in FIG. 4, where the useable portion of the force bias or force function 62 is between vertical lines 64 and 66; the portion of the force function shown by dotted line 68 results from the flecture of contact member 50. Tension-band 18 may also be provided with suitable lateral projections or tabs 70 and 72 at opposite ends thereof with dimensions wider than the guideway opening which abut against diagonally opposite ends at outer surfaces of the casing to insure locking of the roller-band cluster in a stable and repeatable condition and prevent loosening of this condition. Tab 54 may be provided with a slot 74 and opening 76 to permit connection to pin 46. Opening 76 may include one or more ears or other sharp protuberances 78 which may partially score pin 46 upon contact therewith and insure good electrical connections.

Cavity 31 of housing 12, may be filled with an appropriate damping fluid 79 which has a desired viscosity at the temperatures which the device is to be used. A suitable damping fluid may be a silicon oil, such a silicon oil having a viscosity of about .65 centistoke. The damping fluid preferably fills cavity 31 to a sufficient degree or level to provide a bubble 80 within the cavity at all temperatures within the desired operating range.

Since electrical contact or circuit closure between pins 44 and 46 is made by electrical contact through contact member 50 and tension-band 18, it is desirable that the housing members be made of a nonconducting material. A particularly suitable material for this application is glass. The various housing members may be made by any appropriate means, however, it has been found particularly suitable to form the end walls 28 and 30 from glass powders which may be pressed and then sintered at an appropriate temperature to provide a unitary, high strength members. Guideway walls 20 and 22 and sidewalls 24 and 26 may be made from a single glass tube formed by heating the glass tube as it is disposed about a mandrel having dimensions slightly less than the desired internal dimensions of housing 12 and then evacuating the interior of the glass tube. The glass tube may be heated by heating at one end of the mandrel and then moving the heat along the tube as the tube is softened and deformed about the mandrel. The mandrels dimensions may be selected so that when it is heated to this temperature, it expands to the desired dimensions of housing 12. After the housing guideway wall and sidewalls have been formed about the mandrel the heat may be turned off and the tube and mandrel cooled. As the mandrel cools it shrinks to its original size permitting removal of the finished housing walls. The mandrel may be made of sufficient length to permit forming of a tube having dimensions longer than required for one housing and the finished housing walls then cut to desired length.

The roller-band device may be assembled by threading tension-band 18 about rollers 14 and 16 and inserting the same within the housing guideway and sidewalls with tabs 70 and 72 extending therebeyond. A suitable adhesive may be applied as a continuous head around the juncture of end caps 28 and 30 with the guideway and sidewalls and the end caps disposed in their appropriate position. Tab 54 may be bent over end 30 and slid over pin 46 with opening 76 and ears 78 in contact therewith. Washer 56 may then be threaded over pin 46 and pressed against tab 54 and adhered thereto. The seal of housing 12 may now be checked by pressurization through fill tube 42 by appropriate pressurized gas. If housing 12 is leak tight, it may be immersed entirely within a reservoir of damping fluid. The damping fluid may be degassed to insure complete filling of cavity 31. The damping fluid may then be heated to a temperature above the desired temperature operating range for the device while keeping housing 12 immersed therein. When the system has reached equilibrium, fill tube 42 may be clamped or pinched off and the now filled housing removed from the damping fluid. After cleaning of the exterior of housing 12, the end of fill tube 42 may be covered by a bead adhesive to insure complete sealing thereof. As the finished housing is cooled to the operating temperatures, a vapor or vacuum bubble 80 will be formed therein.

In operation, if the roller-band device, is subjected to some acceleration in the direction of arrow 90 in FIG. 1 or to a force in the opposite direction which is sufficient to overcome the force bias produced by opening 60 in tension-band 18, the roller-band cluster 10 may roll along guideway walls 20 and 22 towards contact member 50. As the roller-band cluster 10 rolls along the guideway walls, damping fluid 79 may be metered through orifice 58 and about the ends of rollers 14 and 16 along sidewalls 24 and 26 and through side gaps 25 and 27. If the acceleration or force continues for a sufficient period of time depending on viscosity of the damping fluid and the sizes of opening 58 and the sidewall gaps, the roller-band cluster may contact member 50 and complete the circuit between pins 44 and 46, as shown by the dotted line. The flow through the orifice 58 and the flow through the side passages or gaps 25 and 27 each contribute to the total g-second product contained. The metering rate of orifice 58 may be substantially constant over the temperature range due to the turbulent-type flow of damping fluid therethrough. As the temperature varies over the temperature range, the size of bubble 80 may change, increasing with decreasing temperature. When the device is subjected to an acceleration of force as described above, the bubble 80 will be transferred to the reset end of housing 12. At the lower temperatures, due to the larger size of bubble 80, the rollers will get a head start towards the actuate end and overcome any inconsistencies caused by the laminar flow around the side passages or sidewall gap. The orifice 58 and the bubble 80 thus coact to provide a constant g-second product over the operating temperature range.

Bubble 80 may also perform a safing function, in that since the housing 12 is filled with damping fluid at a temperature above the temperature range, no damage to the housing may occur with excessive temperatures from internal pressures until the temperature is increased above the filled temperature.

The g-second product for a typical roller-band device of FIGS. 1 through 3 may vary with increased g-level. The g-second product may vary less than ±10 percent over the temperature range of from about −65° F to +160° F. For such an operating temperature range, cavity 31 of housing 12 may be filled with damping fluid at a temperature of about 180° F. The filled temperature may be any temperature above the temperature range and may exceed the highest temperature of the range by any amount within the structural limits of the materials of the device, the desired g-second product being monitored and any desired safing level.

These devices may be readily manufactured in miniaturized form. For example, the device of FIG. 1 may be about .780 inches long and about .385 inches square with rollers having an outside diameter of about .180 inches. Orifice 58 may have an area of about .008 square inches compared to a total side gap 25 and 27 area of about .0009 square inches. Such devices may be used to sense forces of less than 60 to about 1000 $g$'s with $g$-second products of, for example, from about .7 to about 3.4 $g$-seconds.

We claim:

1. A roller-band inertial switch operable over a desired temperature range comprising a tubular casing having a pair of guideway walls spaced apart by sidewalls; a tension-band having adjacent one end thereof a lateral projection abutting against an end of said casing and a portion extending along one of said guideway walls an and having adjacent another end thereof a lateral projection abutting against an opposite end of said casing and a portion extending along the other of said guideway walls; a roller-band cluster including a first roller and a spool-shaped roller partially encompassed by said band in generally S-shaped fashion, said band having an oval orifice adjacent said spool-shaped roller and a force-biasing aperture adjacent said first roller and a portion of the guideway wall, ends of said orifice and said aperture being generally V-shape; end caps at the ends of said casing each having a boss fitting into the casing with an edge holding the band against the inner surface of the guideway and having shoulder portions abutting against ends of the casing to position the end caps; and a damping fluid in said casing filling said casing at a desired temperature above said temperature range.

2. The switch of claim 1 wherein said damping fluid fills a variable portion of said casing over said temperature range.

3. The switch of claim 1 wherein said filling temperature is about 180° F. and said temperature range is from about −65° to +160° F.

4. The switch of claim 1 wherein said force-biasing aperture biases said roller-band cluster adjacent one of said end caps and said other end cap carries electrical contact means for sensing movement of said roller-band cluster to said other end cap.

5. The switch of claim 4 wherein said other end cap carries an electrical pin projecting from said casing and said band includes an extension disposed about said other end cap, said extension including an aperture disposed about and in contact with said pin.

6. The switch of claim 5 wherein said electrical contact means includes a contact member disposed within said casing and supported by an electrical pin carried by said other end cap and projecting from said casing.

7. The switch of claim 4 wherein said one end cap carries a fill tube for inserting said damping fluid in said casing.

8. The switch of claim 1 wherein said casing is of glass and said end caps are of sintered powdered glass.

9. The switch of claim 1 wherein said sidewalls are spaced from said roller-band cluster a distance to define a passageway having an area substantially smaller than the area of said oval orifice.

10. The switch of claim 1 wherein said spool-shaped roller includes a pair of rims interconnected by a spindle, the spindle having a diameter substantially less than the rim diameter.